(12) United States Patent
Krueger

(10) Patent No.: US 8,978,212 B2
(45) Date of Patent: Mar. 17, 2015

(54) CLAMPING ELEMENT

(75) Inventor: Manfred Krueger, Buedingen (DE)

(73) Assignee: NORMA Germany GmbH, Maintal (DE)

( * ) Notice: Subject to any disclaimer, the term of this patent is extended or adjusted under 35 U.S.C. 154(b) by 498 days.

(21) Appl. No.: 13/346,279

(22) Filed: Jan. 9, 2012

(65) Prior Publication Data
US 2012/0192387 A1 Aug. 2, 2012

(30) Foreign Application Priority Data
Jan. 27, 2011 (DE) .......................... 10 2011 009 536

(51) Int. Cl.
  F16B 2/10 (2006.01)
  B23P 11/00 (2006.01)
  F16B 2/06 (2006.01)
  F16B 37/04 (2006.01)
  F16L 33/04 (2006.01)

(52) U.S. Cl.
  CPC ............. *F16B 37/044* (2013.01); *F16B 37/043* (2013.01); *F16L 33/04* (2013.01)
  USPC .................................. 24/279; 24/280; 24/284

(58) Field of Classification Search
  CPC ....... F16B 37/043; F16B 37/044; F16L 33/04
  USPC ............................... 24/276, 279, 280, 284, 21
  See application file for complete search history.

(56) References Cited

U.S. PATENT DOCUMENTS

| 2,002,141 A | 5/1935 | Dumke | |
|---|---|---|---|
| 2,409,128 A * | 10/1946 | Krasberg | ........................ 24/280 |
| 2,571,747 A | 10/1951 | Murphy | |
| 2,695,046 A | 11/1954 | Tinnerman, III | |
| 2,787,039 A * | 4/1957 | Krasberg | ......................... 24/279 |
| 5,056,196 A * | 10/1991 | van Walraven | ................. 24/279 |
| 5,769,466 A | 6/1998 | Noel et al. | |
| 5,961,161 A * | 10/1999 | Sponer | ............................. 24/279 |
| 6,447,029 B1* | 9/2002 | Ahn | ............... 285/419 |
| 6,779,762 B2* | 8/2004 | Shibuya | ........................ 248/62 |
| 2002/0166214 A1 | 11/2002 | Wachter | |

FOREIGN PATENT DOCUMENTS

| BE | 499584 | 3/1951 |
|---|---|---|
| CN | 1125303 | 6/1996 |
| DE | 1901917 | 10/1964 |
| DE | 10122647 | 4/2002 |
| DE | 102 15 647 | 12/2002 |
| DE | 203 17 300 | 2/2004 |
| EP | 0601899 | 6/1994 |
| EP | 2177775 | 4/2010 |

(Continued)

OTHER PUBLICATIONS

English language translation of Japanese Office Action conducted in counterpart Japanese Appln. No. 2012-008777 (Mar. 19, 2013).

(Continued)

*Primary Examiner* — Robert J Sandy
(74) *Attorney, Agent, or Firm* — Greenblum & Bernstein, P.L.C.

(57) ABSTRACT

Clamping element and method of forming clamping element. Clamping element includes a spring bracket, which is locked to the clamping element, a polygonal threaded nut, and a tightening screw, which is interacteable with the polygonal threaded nut. The threaded nut is held secured against rotation in the spring bracket.

18 Claims, 3 Drawing Sheets

(56) References Cited

FOREIGN PATENT DOCUMENTS

| JP | 34630 | 3/1915 |
| JP | 38-025721 | 11/1963 |
| JP | 48-103756 | 12/1973 |
| JP | 50-013876 | 2/1975 |
| JP | 3013240 | 4/1995 |
| JP | 3013240 | 7/1995 |
| KR | 20-1984-0005615 | 10/1984 |

OTHER PUBLICATIONS

Chinese Office action conducted in counterpart China Appln. No. 201110443179.4 (Feb. 12, 2014) (w/ English language translation).

Korean Office action conducted in counterpart Korean Appln. No. 10-2012-0007251 (Jan. 15, 2014) (w/ English language translation).

"Schnellbefestiger—Einfache Montage Sicherer Halt Höchster Effizienz,"[Rapid fastener—simple assembly reliable retention highest efficiency] Catalog of KVT-Koenig AG, Dietikon/Switzerland, Edition Aug. 2010. p. 8.

German Office Action dated Mar. 22, 2011 in counterpart German Application No. 20 2011 009 536.5-24 (with partial English language translation.

European Search Report conducted in counterpart European Patent Application No. 11008901.8 (Apr. 5, 2012) (with partial English language translation).

Korean Office Action conducted in Korean counterpart Appln. No. 10-2012-0007251 (Jul. 22, 2013) (w/ English language translation).

Chineses Office Action conducted in China Appln. No. 201110443179.4 (Aug. 6, 2014) (w/ English language translation).

\* cited by examiner

CLAMPING ELEMENT

CROSS-REFERENCE TO RELATED APPLICATIONS

The present application claims priority under 35 U.S.C. §119 of German Patent Application No. 10 2011 009 536.5 filed on Jan. 27, 2011, the disclosure of which is expressly incorporated by reference herein in its entirety.

BACKGROUND OF THE INVENTION

1. Field of the Invention

The invention relates to a clamping element, in particular a tension clamp, with a tightening screw, which interacts with a polygonal threaded nut.

2. Discussion of Background Information

Clamping elements of this type are used, for example, to hold pipes or lines on pipe connections by the application of radial clamping forces. The clamping elements are thereby contracted by tightening the tightening screw, which is screwed into the threaded nut.

In the case of tension clamps, such as, for example, profile clamps, the threaded nut and the tightening screw are supported on respectively one clamping head of the clamp. Since the radius of the tension clamp is reduced during the tightening of the tightening screw, the angular position between the threaded nut and the tightening screw is changed. The necessary actuating forces are thereby increased.

It is known to mount the threaded nut and/or the tightening screw in a pivotable manner. However, a mounting of this type is relatively complex and thus cost-intensive.

SUMMARY OF THE INVENTION

Embodiments of the invention are directed to a simple designed clamping element. In particular, the mounting of the threaded nut on the clamping element is accomplishes in a simple manner. The clamping element can be formed, e.g., as a tension clamp.

In a preferred embodiment of the invention, the threaded nut is held secured against rotation in a spring bracket, which is locked to the clamping element.

The production of a spring bracket can be carried out relatively simply by shaping a corresponding material strip of, for example, metal or the like. Through the use of the spring bracket, a mounting relatively free from play can be obtained, which at the same time is somewhat resilient during the action of external forces, so that angle compensation between the threaded nut and the tightening screw can be carried out without difficulty. The spring bracket can be made of a material different from the clamping element and the threaded nut. The locking connection between the spring bracket and the clamping element permits almost any material combination.

It is preferred for the spring bracket to be embodied or formed or formed in an essentially U-shaped manner and to have a base and two legs. This type of embodiment of the spring bracket can be produced relatively easily. The threaded nut is secured against rotation by the two legs. The threaded nut can bear against the base with a front face. At the same time the spring bracket is held on the clamping element via the legs. The legs can thereby generate, e.g., an elastic holding force.

Preferably, the legs respectively have a first step directed inwards, the threaded nut being held between the base and the first step. The threaded nut is thus held in the spring bracket in a positive manner. The forces occurring while the screw is screwed into the threaded nut are absorbed by the spring bracket. A slight movement can thereby be possible between the spring bracket and the clamping element. This is used to facilitate threading-in of the threaded screw during assembly.

Preferably, at least two holding tabs extend from the base on respectively one side, which hold the threaded nut laterally. The threaded nut then cannot be separated from the spring holder either in a direction that runs transversely to the screwing-in direction. Instead, the threaded nut is thus, as it were, shaped into or bracketed into the spring bracket and held secured against loss. The holding tabs, in addition to the legs, can thereby absorb a possibly occurring torque. They are likewise used to prevent rotation by the threaded nut. Higher torques can be absorbed thereby.

Advantageously, the legs respectively have a second step directed outwards. A locking groove is embodied or formed or formed between the first step and the second step on an outside of the legs. This locking groove interacts with a correspondingly embodied or formed edge of an opening of the clamping element, so that the spring bracket and thus the threaded nut is held secured against loss on the clamping element. The locking groove can thereby have an extension such that a pivoting behavior of the spring bracket with the threaded nut is permitted. The spring bracket is then engaged with the clamping element in a pivotable manner.

It is particularly preferred that at least one thread is shaped in the region of the locking groove on an inside of the legs. This thread can be embodied or formed in a relatively simple manner, for example, as a shaped metal sheet. A thread of this type is used to preassemble the tightening screw. The insertion of the tightening screw into the threaded nut is simplified thereby. In embodiments, the tightening screw can already be inserted into the thread in the region of the locking groove before the assembly of the clamping element, and is thus held secured against loss.

In another preferred embodiment, free ends of the legs are bent towards one another. The ends can optionally be brought into engagement with a thread of the tightening screw. For this purpose the free ends can be embodied or formed accordingly, that is, for instance, flattened and/or provided with a curvature. With the free ends of the legs bent inwards, a guide of the tightening screw can take place, so that it can be inserted into the threaded nut more easily. If the ends can be brought into engagement with a thread of the tightening screw, a prepositioning of the tightening screw can be carried out securing the tightening screw against loss. No additional components are necessary. Instead, the prepositioning is carried out with very simple means already present.

Preferably, securing tabs are provided on the legs, which are embodied or formed in particular in one piece with the legs. The securing tabs are used to lock the spring bracket with the clamping element and thus prevent the spring bracket from accidentally falling out. In the case of a one-piece embodiment, the securing tabs can be produced by simply punching out and bending over. The production expenditure thus remains low. An adequate elasticity of the securing tabs can thereby be ensured by the selection of a corresponding wall thickness of the spring bracket, so that an easy assembly is ensured.

Preferably, open edges are embodied or formed between the holding tabs and the legs. Open edges of this type facilitate the shaping operation to produce the spring bracket and render possible the production with relatively large tolerances, since edges of the threaded nut are easily positioned in the region of the open edges of the spring bracket, so that unnecessary force is avoided.

Embodiments of the instant invention are directed to a clamping element that includes a spring bracket, which is locked to the clamping element, a polygonal threaded nut, and a tightening screw, which is interacteable with the polygonal threaded nut. The threaded nut is held secured against rotation in the spring bracket.

According to embodiments, the clamping element can be formed as a tension clamp. Further, the spring bracket can be embodied in an U-shaped manner having a base and two legs. The legs may respectively have a first step directed inwards and the threaded nut being held between the base and the first step. At least two holding tabs can extend from the base on different sides of the base, which hold the threaded nut laterally. Moreover, the legs can respectively have a second step directed outwards, and a locking groove may be embodied between the first step and the second step on an outside of the legs. At least one thread can be shaped in the region of the locking grooves on an inside of the legs.

In accordance with other embodiments, free ends of the legs may be bent towards one another and are engageable with a thread of the tightening screw.

According to still other embodiments of the invention, securing tabs can be provided on the legs. The securing tabs may be embodied in one piece with the legs.

In accordance with further embodiments, open edges may be embodied between the holding tabs and the legs.

Embodiments of the invention are directed to a method for forming a clamping element. The method includes placing a polygonal threaded nut in a spring bracket, and locking the spring bracket to the clamping element.

In accordance with embodiments, the clamping element may be formed as a tension clamp.

According to other embodiments of the invention, the method can further include securing the threaded nut in the spring bracket against rotation.

Further, the spring bracket can include legs and the method may further include inserting the legs of the spring bracket into an opening of the clamping element.

The spring bracket may include legs and the method can also include engaging an opening of the clamping element with an outer side of the legs.

Embodiments of the invention are directed to a tension clamp that includes a clamping band with clamping heads, a spring bracket attached to one of the clamping heads, and a polygonal threaded nut securely held against rotation in the spring bracket.

Moreover, the clamping head can include at least one recess and the spring bracket may be arranged to engaged the at least one recess.

According to other embodiments of the invention, a tightening screw may interact with the threaded nut.

In accordance with still yet other embodiments of the present invention, the spring bracket may include at least two legs arranged to hold the polygonal threaded nut.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

Figure 1:
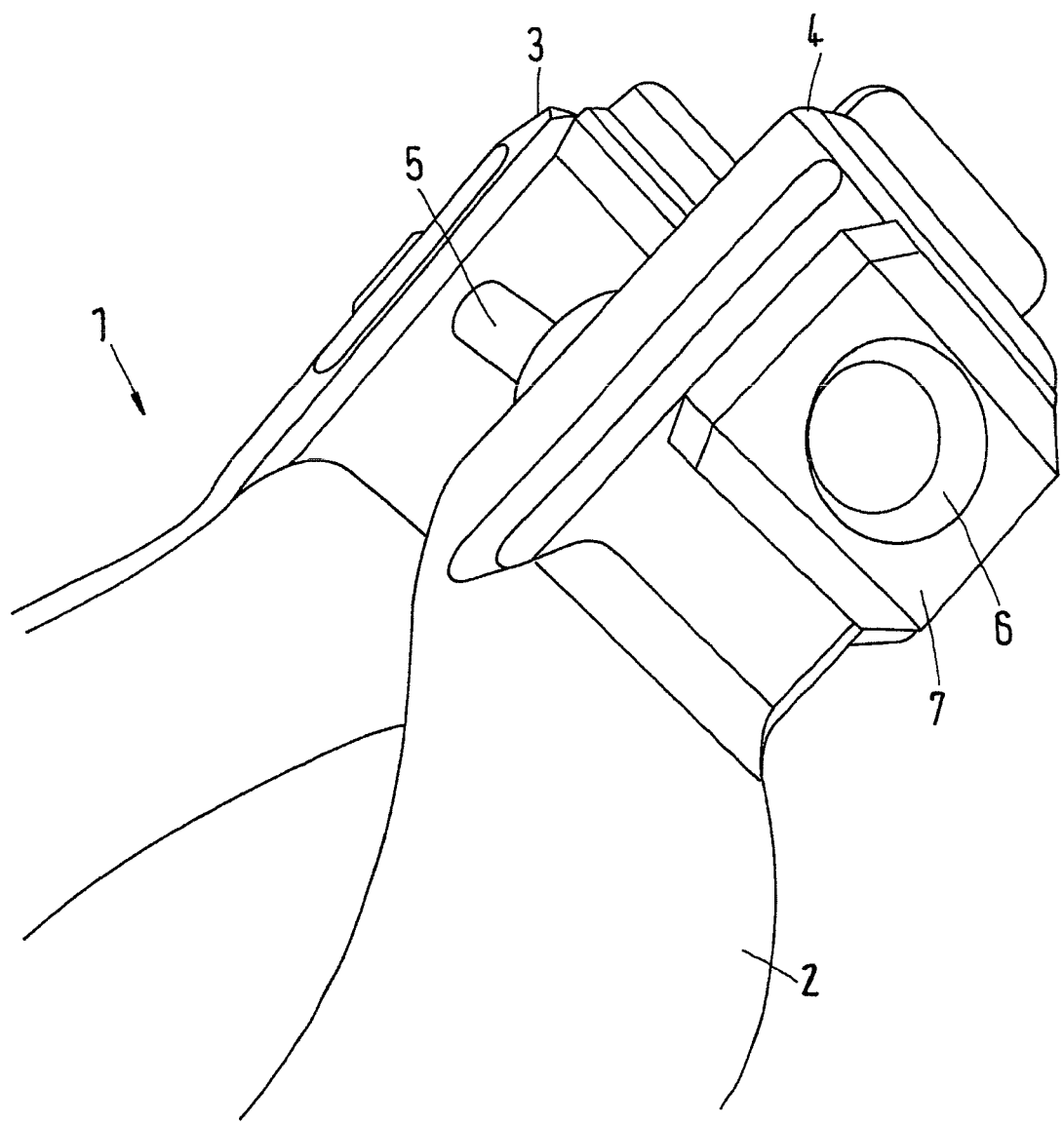
FIG. 1 illustrates a clamping element.

FIG. 1 shows a clamping element 1, which is embodied or formed as a profile clamp, and advantageously as a tension clamp. The clamping element 1 has a clamping band 2, which is provided on its ends with clamping heads 3, 4. A tightening screw 5, provided to tighten the profile clamp, interacts with a threaded nut 6. The threaded nut 6 is held secured against rotation in a spring bracket 7, which is engaged with the clamping element 1 on the clamping head 4.

In this example, the threaded nut 6 is embodied or formed as a square nut. However, it is also conceivable to use a hexagon nut, for example.

Figure 2:
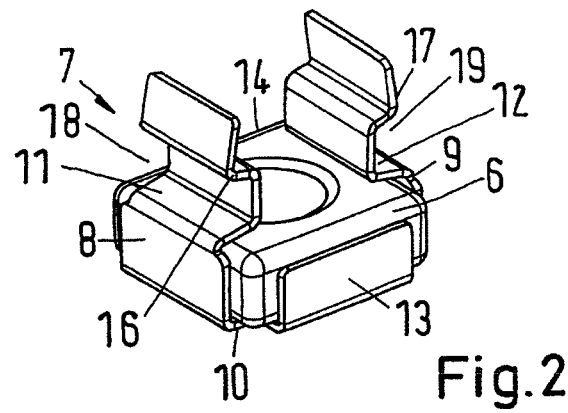
FIG. 2 illustrates a spring bracket of a first embodiment in a three-dimensional view.

The embodiment of the spring bracket 7 according to a first embodiment is shown in FIG. 2. The spring bracket 7 is embodied or formed essentially in a U-shaped manner with two legs 8, 9 and a base 10. The threaded nut 6 bears against an inside of the base 10. This threaded nut is embodied or formed in turn as a square nut. The legs 8, 9 have a first step 11, 12 directed inwards, and the threaded nut 6 is held between the respective first step 11, 12 and the base 10. The legs 8, 9 at the same time bear laterally against the threaded nut 6, so that a securing against rotation is already provided thereby.

In addition, holding tabs 13, 14 are provided, which extend from the base 10 and are bent over upwards in a perpendicular manner, so that a further securing against rotation of the threaded nut 6 takes place. At the same time, the threaded nut 6 is thus held in a positive manner in a plane perpendicular to a screwing-in direction of the tightening screw 5. The threaded nut 6 is thus held in the spring bracket 7 secured against loss.

The legs 8, 9 respectively have a second step 16, 17, which is directed outwards. A locking groove 18, 19 is embodied or formed respectively between the first step 11, 12 and the second step 16, 17.

Figure 3:
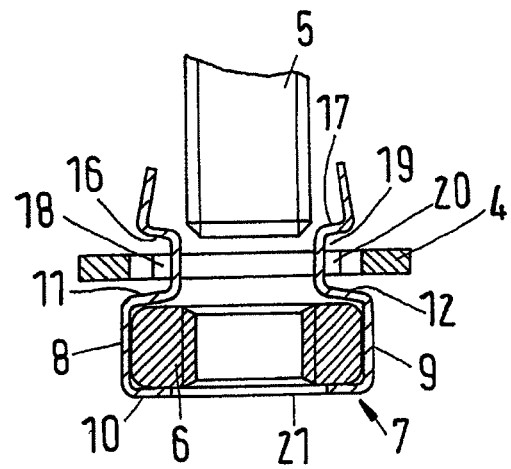
FIG. 3 illustrates the spring bracket according to FIG. 2 in sectional view.

As can be seen from FIG. 3, the spring bracket 7 is inserted in a corresponding opening 20 in the clamping head 4 and locked there such that edges of the opening 20 are positioned in the region of the locking grooves 18, 19. A distance between the first step 11, 12 and the second step 16, 17 is thereby greater than a material thickness of the clamping head 4, so that a pivoting of the spring bracket 7 in a desired range is possible.

It is thereby possible to align the threaded nut 6 with respect to the tightening screw 5 in terms of angle.

The base 10 of the spring bracket 7 is provided with a central opening 21, through which the tightening screw 5 can be guided. The travel distance of the tightening screw is thus not restricted by the spring bracket 7.

In the region of the locking grooves 18, 19, the legs 8, 9 can have respectively at least one thread on their inside, which interacts with the tightening screw 5. A preassembly of the tightening screw 5 is thereby possible. It is also conceivable to embody or form the inside of the legs 8, 9 in a smooth manner. A sliding guide of the tightening screw 5 can then take place via the inside, so that an insertion of the tightening screw 5 into the threaded nut 6 is relatively easily possible.

Figure 4:
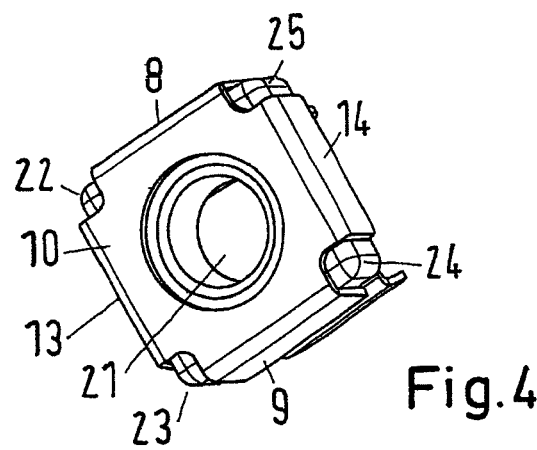
FIG. 4 illustrates the spring bracket from FIGS. 2 and 3, from another viewing direction.

FIG. 4 shows the spring bracket 7 with the threaded nut 6 in a three-dimensional representation, but from a different perspective than in FIG. 2. It is discernible that edges 22, 23, 24, 25 of the spring bracket 7 are embodied or formed as open edges, through which corners or edges of the threaded nut 6 project. The spring bracket 7 can thereby be produced with relatively high tolerances, which renders possible a simple production by means of bending process.

The legs 8, 9 and the holding tabs 13, 14 are thereby embodied or formed in one piece with the base 10.

Figure 5:
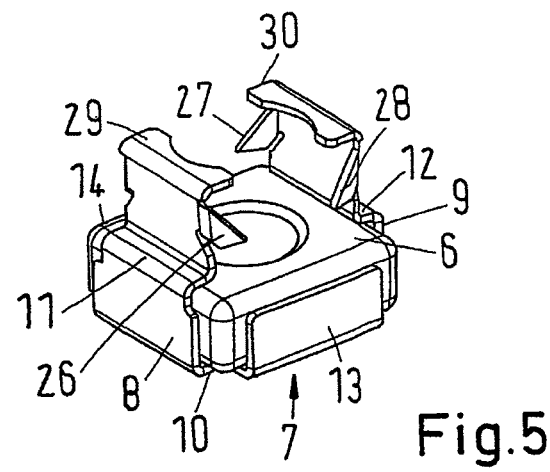
FIG. 5 illustrates a spring bracket of a second embodiment in a three-dimensional representation.

FIG. 5 shows a spring bracket 7 of a second embodiment, in which identical parts are provided with corresponding reference numbers. Like the spring bracket 7 according to the embodiment of FIGS. 2 through 4, the spring bracket 7 in FIG. 5 has two legs 8, 9, which extend from a base 10, so that the spring bracket 7 is embodied or formed in an essentially U-shaped manner. In addition, holding tabs 13, 14 are provided. The legs 8, 9 have a first step 11, 12 directed inwards. The threaded nut 6 is held between the first step 11, 12 and the base 10 as well as between the legs 8, 9 and the holding tabs 13, 14 in a positive manner and secured against loss.

The legs 8, 9 are provided with securing tabs 26, 27, 28, 28' directed inwards, which are used to lock the spring bracket 7 in the clamping element 1 or in a clamping head 4. Free ends 29, 30 of the legs 8, 9 are bent towards one another and embodied or formed so that they can be brought into engagement with a thread of the tightening screw. A relatively simple prepositioning of the tightening screw can thus take place. This embodiment is shown in FIG. 6.

Figure 6:
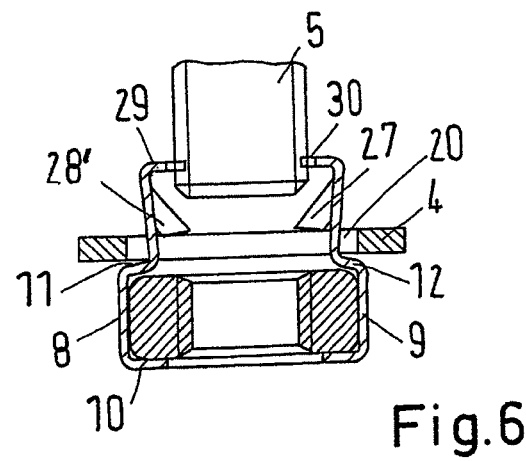
FIG. 6 illustrates the spring bracket according to FIG. 5 in sectional representation and FIG. 7 illustrates the spring bracket according to FIGS. 5 and 6 from another viewing direction.
Figure 7:
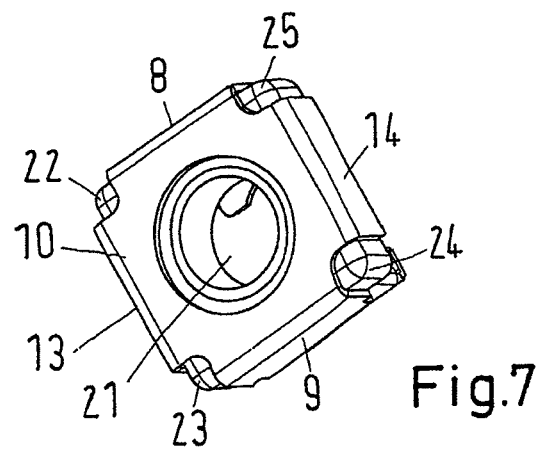

FIG. 7 shows the spring bracket 7 according to FIGS. 6 and 5 in a three-dimensional presentation, but from a different perspective. The spring bracket 7 of this embodiment also has open edges 22, 23, 24, 25.

The securing tabs 26, 27, 28, 28' shown in the embodiment according to FIGS. 5 through 7 can also be used with the embodiment according to FIGS. 2 through 4.

In an embodiment of the threaded nut 6, for example, as a hexagon nut, accordingly further holding tabs 13, 14 can be provided, in which edges 22, 23, 24, 25 between the holding tabs 13, 14 can be embodied or formed in an open manner accordingly.

Via the embodiment of the clamping element 1 according to the invention with the spring bracket 7, industry-standard threaded nuts 6, such as square or hexagon nuts, can be used. These threaded nuts 6 are bracketed in the spring bracket 7 secured against rotation. So they are held positively and secured against loss. Through the embodiment of the spring bracket 7 with the legs 8, 9, the spring bracket 7 can be clipped into the clamping head 4 of a profile clamp or another tension clamp 1, for example. Even a corresponding pivoting behavior of the spring bracket 7 can be achieved thereby, so that a relatively easy assembly, in particular a simple insertion of the tightening screw 5 into the threaded nut 6 is possible. It is also possible without great expenditure to provide a guide of the tightening screw 5, before it is brought into engagement with the threaded nut 6. Thereby already a pre locking of the tightening screw 5 can take place. A simple preassembly is thereby possible. Since only a locking connection takes place between the spring bracket 7 and the clamping element 1, a variety of materials can be combined with one another. In particular, it is not necessary to produce the spring bracket 7 from the same material as the clamping element 1.

Overall, a relatively simple support of the threaded nut 6 on the clamping element 1 is rendered possible, which at the same time permits a certain deviation, so that a simple threading of the tightening screw 5 is ensured.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A tension clamp comprising:
a spring bracket locked to a clamping head to be pivotable;
a polygonal threaded nut; and
a tightening screw, which is interactable with the polygonal threaded nut,
wherein the threaded nut is held secured against rotation in the spring bracket, and the threaded nut and tightening screw are supported on the clamping head.

2. The tension clamp according to claim 1, wherein the spring bracket is embodied in an U-shaped manner having a base and two legs.

3. The tension clamp according to claim 2, wherein the legs respectively have a first step directed inwards and the threaded nut being held between the base and the first step.

4. The tension clamp according to claim 2, wherein at least two holding tabs extend from the base on different sides of the base, which hold the threaded nut laterally.

5. The tension clamp according to claim 4, wherein open edges are embodied between the holding tabs and the legs.

6. The tension clamp according to claim 3, wherein the legs respectively have a second step directed outwards, and wherein a locking groove is embodied between the first step and the second step on an outside of the legs.

7. The tension clamp according to claim 6, wherein at least one thread is shaped in the region of the locking grooves on an inside of the legs.

8. The tension clamp according to claim 2, wherein free ends of the legs are bent towards one another and are engageable with a thread of the tightening screw.

9. The tension clamp according to claim 2, wherein securing tabs are provided on the legs.

10. The tension clamp according to claim 9, wherein the securing tabs are embodied in one piece with the legs.

11. A method for forming a tension clamp comprising:
placing a polygonal threaded nut in a spring bracket; and
locking the spring bracket to a clamping head so that the threaded nut is pivotable in relation to the clamping head.

12. The method according to claim 11, further comprising securing the threaded nut in the spring bracket against rotation.

13. The method according to claim 11, wherein the spring bracket comprises legs and the method further comprises inserting the legs of the spring bracket into an opening of the clamping element.

14. The method according to claim 11, wherein the spring bracket comprises legs and the method further comprises engaging an opening of the clamping element with an outer side of the legs.

15. A tension clamp comprising:
   a clamping band with clamping heads;
   a spring bracket pivotably attached to one of the clamping heads; and
   a polygonal threaded nut securely held against rotation in the spring bracket.

16. The tension clamp according to claim 15, wherein the clamping head comprises at least one recess and the spring bracket is arranged to engaged the at least one recess.

17. The tension clamp according to claim 15, wherein a tightening screw interacts with the threaded nut.

18. The tension clamp according to claim 15, wherein the spring bracket comprises at least two legs arranged to hold the polygonal threaded nut.

* * * * *